United States Patent [19]

Walker

[11] Patent Number: 5,598,658
[45] Date of Patent: Feb. 4, 1997

[54] FISHING LURE WRAP

[76] Inventor: Wayne M. Walker, 1011 Amherst Rd., Panama City, Fla. 32405

[21] Appl. No.: 375,609

[22] Filed: Jan. 20, 1995

[51] Int. Cl.⁶ .................................................. A01K 97/06
[52] U.S. Cl. ............................. 43/25.2; 24/306; 428/100
[58] Field of Search ............................ 43/25, 25.2, 57.1; 150/154; 224/920, 901; 24/306, DIG. 11, 481, 304; 428/100

[56] References Cited

U.S. PATENT DOCUMENTS

| | | | |
|---|---|---|---|
| 3,190,027 | 6/1965 | Spangler | 43/25.2 |
| 3,199,243 | 8/1965 | Caston | 43/25.2 |
| 3,279,008 | 10/1966 | Wallach | 24/306 |
| 4,220,302 | 9/1980 | Hampton et al. | 248/102 |
| 4,418,490 | 12/1983 | Ancona | 43/25.2 |
| 4,831,772 | 5/1989 | Gillespie | 43/25 X |
| 4,881,684 | 11/1989 | Chinman | 224/901 |
| 5,020,264 | 6/1991 | Demski | 43/25.2 |
| 5,131,180 | 7/1992 | Ives | 43/25.2 |
| 5,214,874 | 6/1993 | Faulkner | 43/25.2 |
| 5,237,769 | 8/1993 | Navarro | 43/21.2 |
| 5,289,619 | 3/1994 | Pileggi | 24/306 |

*Primary Examiner*—J. Elpel
*Attorney, Agent, or Firm*—Peter Loffler

[57] ABSTRACT

A fishing lure wrap for use in securing a lure in close proximity to the shaft of a fishing rod and away from contact with other lures, clothing, skin, and the like. The device comprises a sheet of soft pliable material having a portion of cooperating hook and loop material attached on outer surface and the corresponding portion of hook and loop material attached on the inner surface. When the device is wrapped around the shaft and the lure, the hook and loop portion cooperate to hold the device securely in place. An optional sponge can be used to keep natural bait moist for extended lengths of time.

14 Claims, 2 Drawing Sheets

FISHING LURE WRAP

BACKGROUND OF THE INVENTION

1. Field of the Invention

The present invention relates to a fishing accessory and more particularly to an accessory used to securely wrap lures to fishing rods.

2. Background of the Prior Art

Many fishermen, particularly those fishing for bass, carry and interchangeably use several sets of fishing equipment. Each such set includes a rod, a reel, and a line having a lure attached thereon. When moving these sets into and out of the fishing boat or while the boat is traveling, the lures are prone to becoming entangled with other lures, carpeting, boat fabric, clothing, and the like. Untangling the lures or cutting the line and thereafter retying the lures thereto requires expenditure of considerable time and effort which expenditure is undesired especially during restricted light conditions of early dawn or late evening. Movement of the rods creates the potential for personal injury from a lure coming in contact with the body.

There are several measures that can be taken in order to avoid lure entanglement. One such method involves attaching a ring at the base of the rod shaft, placement of the lure hook into the ring, and tightening the line. This method suffers from many drawbacks as it does not remove the potential for personal injury. Furthermore, use of this method is not practical with soft plastic lures as the hook would need to be removed during lure securement and replaced in order to utilize the lure.

Another method used to avoid lure entanglement involves snapping a plastic box onto the rod shaft and placing the lure into the box. The box is clumsy to use and tends to be too small for many types of lures.

There is a need in the art for a device that will securely hold a lure attached to a line when the rod is being moved or otherwise not being used. The device should be easy to use with any size and type of lure. The device should eliminate the potential for personal injury. Ideally, the device will, if desired, keep a lure moist for extended periods of time.

SUMMARY OF THE INVENTION

The fishing lure wrap of the present invention meets the above-identified needs in the art. The device wraps around the shaft of a fishing rod and binds a lure to the shaft. This secures the lure and covers the hook of the lure preventing the lure from entangling with other lures and with human contact.

The fishing lure wrap comprises a sheet of pliable plastic material having an inner surface and an outer surface. One portion of cooperating hook and loop material is attached to the outer surface of the sheet while the corresponding portion is attached to the inner surface. When the device is wrapped around the shaft and lure, the cooperating hook and loop portions hold the sheet securely encompassed around the shaft. Parallel oriented ribs on the outer surface help a user grip the device while a plurality of teeth on the inner surface help grasp the lure secured therein.

An optional strip of hook and loop portion, corresponding to the portion attached to the outer surface, can be securely attached around the shaft of the rod at the point of wrapping of the sheet. When the sheet is wrapped around shaft, a section of the hook and portion attached to the outer surface of the sheet is first attached to this corresponding hook and loop portion before the wrapping is begun to help tightly secure the sheet around the shaft.

An optional sponge can be removably attached to the inner surface of the sheet. The sponge will assist in keep pork rind and other natural bait moist for extended lengths of time.

DETAILED DESCRIPTION OF THE PREFERRED EMBODIMENT

Figure 1:
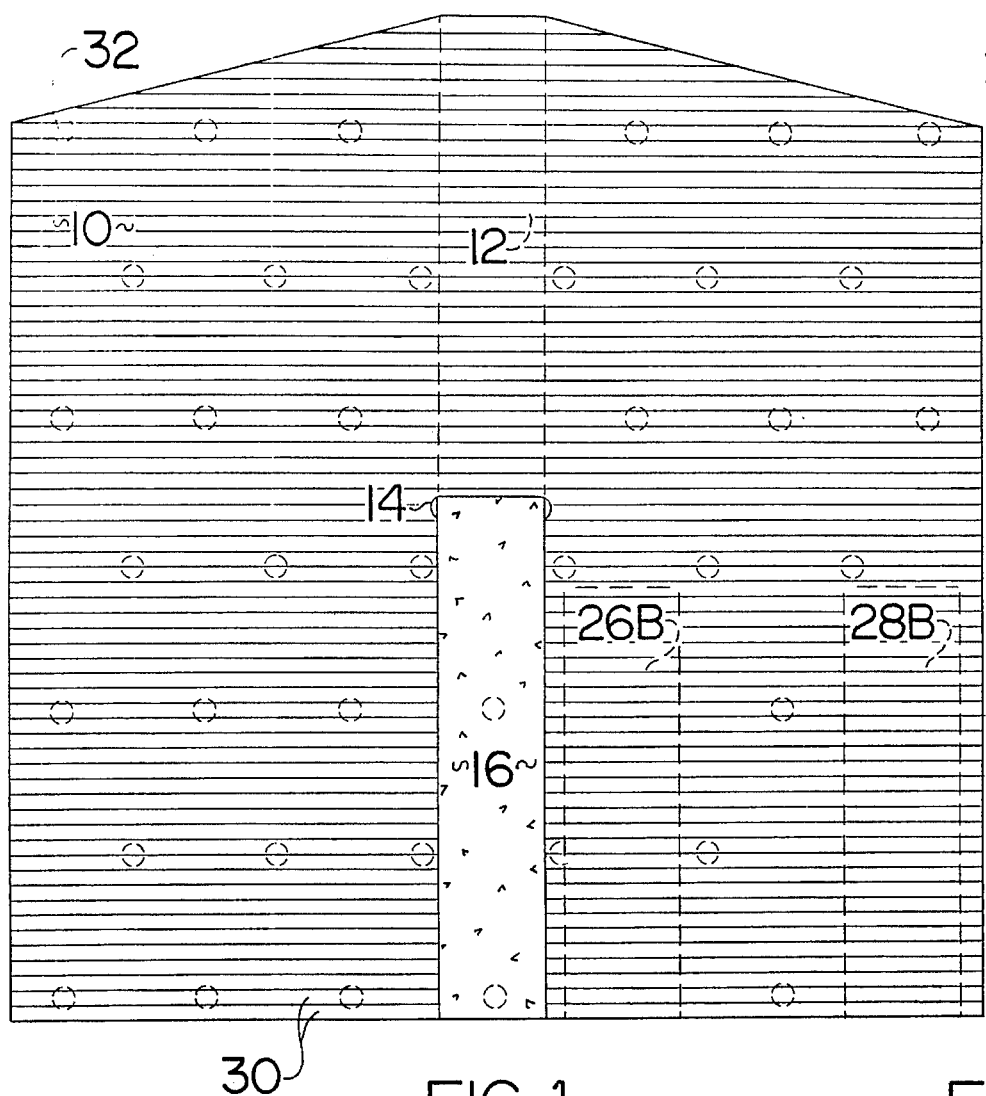
FIG. 1 is a top elevation view of the fishing lure wrap of the present invention.
Figure 2:
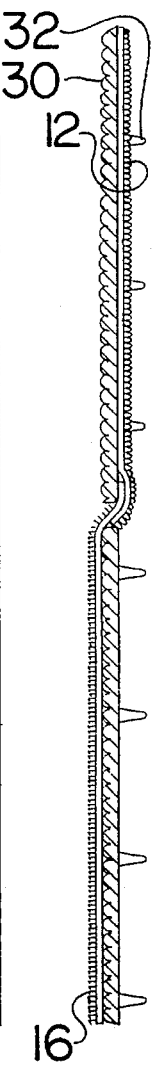
FIG. 2 is a cutaway view of FIG. 1.
Figure 3:
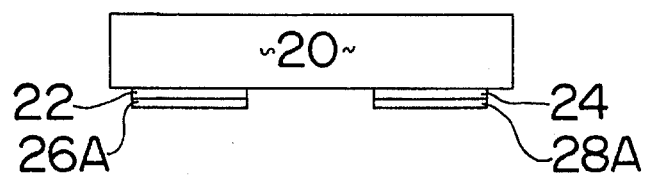
FIG. 3 is a side elevation view of the optional sponge utilized with the present invention.
Figure 4:
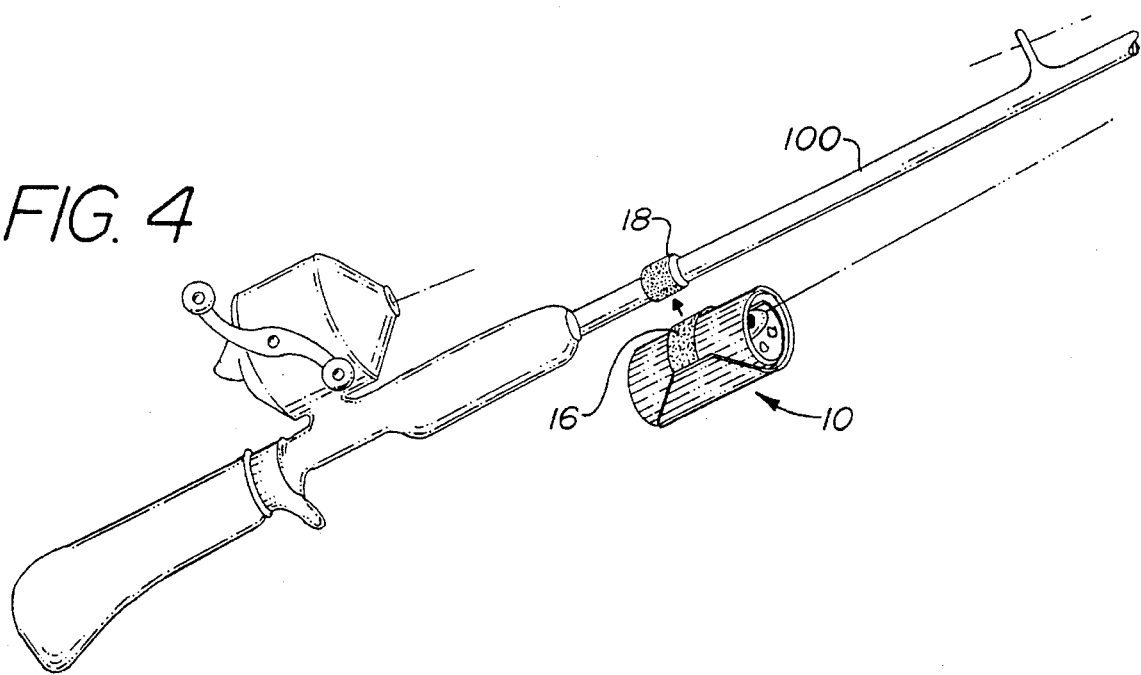
FIG. 4 illustrates the use of the device with the supplementary holder in conjunction with a fishing rod Similar reference numerals refer to similar parts throughout the several views of the drawings.

Turning now to the drawings, it is seen that the fishing lure wrap of the present invention comprises a generally rectangular sheet 10. The sheet 10 has an inner surface and outer surface and is made from pliable plastic sheeting. A plurality of parallel oriented ribs 30 is located on the outer surface while a plurality of teeth 32 is located on the inner surface of the sheet 10. The top of the sheet 10 is tapered in either direction with the tapering beginning slightly away from the center point of the top of the sheet 10.

A slot 14, in parallel orientation to the ribs, is located in the middle of the sheet. A generally rectangular strip portion 12 of cooperating hook and loop material is attached Onto the inner surface, in vertical alignment, beginning from the top and terminating in the middle of the sheet 10. No teeth are located along the point of attachment of portion 12. A generally rectangular strip portion 16 of cooperating hook and loop material, corresponding to portion 12, is attached onto the outer surface, in vertical alignment, beginning from the top and terminating in the middle of the sheet with the end of the strip 16 inserted through slot 14 and secured therebeyond. This insertion of the portion 16 helps prevent detachment of the portion 16 from the sheet 10.

In order to utilize the fishing lure wrap of the present invention, a lure is placed in close proximity to the shaft 100 of a fishing rod. The sheet 10 is placed near the shaft 100. Beginning with the bottom of the sheet 10, the sheet is wrapped snugly around the lure and shaft 100 until the portion 12 contacts and cooperates with portion 16 thereby securely holding the lure to the shaft 100. In order to liberate the lure, the sheet 10 is unwrapped from around the shaft 100. The tapering of the top helps in grasping the sheet 10.

In order to assure a tight fit of the sheet around the shaft, a strip portion 18 of cooperating hook and loop portion, corresponding to portion 16, is securely encircled around the shaft 100 of the rod. When wrapping the sheet 10 around the shaft 100, a section of portion 16 at the bottom of the sheet 10, is first attached to portion 18 before beginning the wrapping of the sheet 10 around the lure and rod.

In order to keep natural bait moist for a period of time, an optional sponge 20 is attached to the inner surface of the sheet 10. The sponge 20 can be attached to the sheet by cooperating hook and loop material with a pair of loop (or hook) portions 22 and 24 permanently attached to the sponge 20 and a pair of corresponding hook (or loop) portions 26A and 28A attached to the sheet at points 26B and 28B respectively,. In such a configuration, the sponge 20 can be attached and removed as desired.

While the invention has been particularly shown and described with reference to an embodiment thereof, it will be understood by those skilled in the art that various changes in form and detail may be made without departing from the spirit and scope of the invention.

I claim:

1. A fishing lure wrap comprising:

a generally rectangular-shaped sheet having an outer surface and an inner surface, a top and a bottom, and a middle portion;

a first portion of cooperating hook and loop material, attached to the outer surface beginning at the bottom and terminating at the middle portion;

a second portion of cooperating hook and loop material, corresponding to the first portion, attached to the inner surface beginning at the top and terminating at the middle portion; and a slot located on the sheet at the middle portion and wherein an end of the second portion is inserted through the slot and secured therebeyond.

2. The device as in claim 1 wherein the sheet is constructed from soft pliable material.

3. The device as in claim 1 to further include a plurality of parallel oriented ribs located on the outer surface.

4. The device as in claim 1 to further include a plurality of teeth located on the inner surface.

5. The device as in claim 4 wherein the teeth are constructed of soft pliable material.

6. The device as in claim 1 wherein the top is tapered in either direction with the tapering beginning just off of the midpoint of the top.

7. The device as in claim 1 in combination with a third portion of cooperating hook and loop material, corresponding to the second portion, secured around a shaft of a fishing rod.

8. The device as in claim 1 to further include a sponge removably attached to the inner surface in close proximity to the bottom.

9. A fishing lure wrap comprising:

a generally rectangular-shaped sheet, constructed from a soft pliable material, having an outer surface with a plurality of parallel oriented ribs located thereon and an inner surface having a plurality of teeth located thereon, a tapered top and a bottom, and a middle portion;

a first portion of cooperating hook and loop material, attached to the outer surface beginning at the bottom and terminating at the middle portion;

a second portion of cooperating hook and loop material, corresponding to the first portion, attached to the inner surface beginning at the top and terminating at the middle portion;, and a slot located on the sheet at the middle portion and wherein an end the second portion is inserted through the slot and secured therebeyond.

10. The device as in claim 9 in combination with a third portion of cooperating hook and loop material, corresponding to the second portion, secured around a shaft of a fishing rod.

11. The device as in claim 9 to further include a sponge removably attached to the inner surface in close proximity to the bottom.

12. A fishing lure wrap comprising:

a generally rectangular-shaped sheet, constructed from a soft pliable material, having an outer surface with a plurality of parallel oriented ribs located thereon and an inner surface having a plurality of teeth located thereon, a tapered top and a bottom, and a middle portion;

a first portion of cooperating hook and loop material, attached to the outer surface beginning at the bottom and terminating at the middle portion;

a second portion of cooperating hook and loop material, corresponding to the first portion, attached to the inner surface beginning at the top and terminating at the middle portion; and a sponge removably attached to the inner surface in close proximity to the bottom.

13. The device as in claim 12 to further include a slot located on the sheet at the middle portion and wherein an end of the second portion is inserted through the slot and secured therebeyond.

14. The device as in claim 12 in combination with a third portion of cooperating hook and loop material, corresponding to the second portion, secured around a shaft of a fishing rod.

* * * * *